UNITED STATES PATENT OFFICE 2,648,670

PREPARATION OF GUANAZOLES

Donald W. Kaiser, Old Greenwich, and John J. Roemer, Stamford, Conn., assignors to American Cyanamid Company, New York, N. Y., a corporation of Maine No Drawing. Application February 19, 1951, Serial No. 211,804

8 Claims. (Cl. 260—308)

The present invention relates to the preparation of guanazoles by reacting a dicyanamide with a hydrazine in an inert solvent. Broadly the invention contemplates the reaction of dicyanamide, $HN(CN)_2$ with a hydrazine of the formula

in which R and R' is hydrogen or an organic hydrocarbon residue of a type defined hereinafter, or a salt thereof to form the corresponding guanazole, according to the overall reaction:

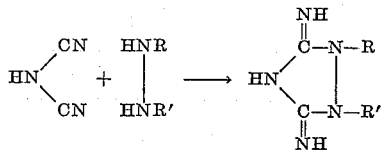

As free dicyanamide is difficult to work with owing to its instability it is preferred to form it in situ from one of its salts. More particularly, therefore, the invention contemplates the reaction of a metal dicyanamide salt of the formula

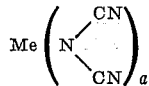

in which Me is a metal or a metal-acting group, including sodium, potassium, ammonium, and the other members of the alkali metal group; calcium, strontium, barium, zinc, and the like; and $a$ is the metal valence—with a hydrazine or an acid addition salt of a hydrazine, in which the hydrazine portion has the formula

in which R and R' are hydrogen, alkyl, aryl, alkaryl, or aralkyl, and are the same or different. The nature of R or R' is otherwise immaterial, as it does not enter into nor substantially influence the reaction. The acid portion of the hydrazine salt is likewise substantially immaterial; it can be the sulfate, chloride, phosphate, nitrate, acetate, or the like.

The substituted hydrazines employed in this invention can be made by methods well known in the art, as for example the methods reviewed by Byrkit and Michalek, Ind. & Eng. Chem., 42, 1862–75 (1950).

It is reported that free dicyandiamide will react with an equivalent of hydrazine monohydrochloride to give guanazole. (J. Chem. Soc., Abstracts, 66, 1, 518 (1894).) However, free dicyanamide will not react with an equivalent of hydrazine monohydrochloride to give guanazole. In fact, it has been found that guanazole can be made from dicyanamide and a hydrazine salt only if enough alkali is present in the reaction mass to react with all of the acid part of the hydrazine salt. Thus, if it is sought to react hydrazine monohydrochloride with free dicyanamide (for example formed by reacting sodium dicyanamide with hydrochloric acid), it is necessary to add alkali equivalent to the HCl portion of the hydrazine salt. It is of course preferred to neutralize the acid portion of the hydrazine salt by means of the metal substituent of the dicyanamide salt insofar as this is possible. Thus one can react sodium dicyanamide directly with an equivalent of hydrazine monohydrochloride, whereby the sodium of the dicyanamide neutralizes all of the hydrochloride of the hydrazine, simultaneously forming free dicyanamide and free hydrazine, which then reacts to form guanazole.

When a polyacidic salt of hydrazine is used, such as the dihydrochloride or the sulfate, enough additional alkali (over and above that contained in the dicyanamide salt) must be added to the reaction mass to neutralize such additional acidity. Thus when one mole of sodium dicyanamide is reacted with one mole of hydrazine sulfate, $H_2NNH_2.H_2SO_4$, an additional equivalent of alkali, such as one mole of sodium metal, one mole of sodium hydroxide, or even one mole of hydrazine hydrate, should be added to ensure that all the hydrazine salt is rendered approximately neutral in pH.

While it is possible to obtain guanazole by reacting a considerable excess of a free hydrazine with free dicyanamide, the reverse is not completely true, e. g., 2 moles of free dicyanamide refluxed with one mole of a free hydrazine gives no guanazole. Consequently when equimolar amounts of calcium dicyanamide and hydrazine sulfate are reacted, the desired product is not obtained despite the fact that all the hydrazine salt is neutralized. However, if the excess free dicyanamide is neutralized, as by the addition of an equivalent of alkali, the reaction proceeds normally. It has been found that only a small excess of free dicyanamide can be tolerated. If the excess is so great that the pH of the reaction mass is below about 4, little or no guanazole is obtained, and this consideration holds true whether the excessive acidity results from an excess of dicyanamide or from the use of the less basic hydrazines, such as phenylhydrazine. Consequently, if the reaction mass pH is below 4, it must be made more basic. This can be conveniently done by the addition of alkali, or by adding a buffer of any well known type, such as sodium acetate. A buffer is particularly suitable when there is no stoichiometric excess of dicyanamide and the low pH results from the use of one of the less basic hydrazines.

The following schedule is illustrative of various dicyandiamide salts and hydrazine compounds that can be used in the process, with an indication of alkali (if any) necessary to provide substantial neutrality.

| Dicyanamide Salt | Hydrazine Compound | Alkali Added | Product |
|---|---|---|---|
| 1 mole zinc dicyanamide | 1 mole hydrazine sulfate | 1 mole NaOH (or ½ mole Na₂CO₃, etc.). | guanazole. |
| 1 mole potassium dicyanamide | 1 mole hydrazine dihydrochloride. | 1 mole KOH or equivalent. | Do. |
| 1 mole calcium dicyanamide | 2 moles p-tolyl hydrazine hydrochloride. | none necessary | p-tolyl guanazole. |
| 1 mole ammonium dicyanamide | 1 mole α-naphthyl-hydrazine hydrochloride. | ......do...... | α-naphthyl-guanazole. |
| 1 mole calcium dicyanamide | 2 moles methyl hydrazine hydrochloride. | ......do...... | methyl guanazole. |
| 1 mole sodium dicyanamide | 1 mole 1-methyl-2-phenyl hydrazine hydrochloride. | ......do...... | 1-methyl-2-phenyl guanazole. |
| Do | 1 mole 1,2-diisopropyl hydrazine. | ......do...... | 1,2-diisopropyl guanazole. |
| Do | 1 mole sym-diphenylhydrazine hydrochloride. | none necessary, buffer improves yield. | sym-diphenyl guanazole. |

The general procedure is to heat the dicyanamide salt with the hydrazine (or substituted hydrazine) compound in an inert solvent such as water, ethyl alcohol, dioxane, acetonitrile, methanol, cellosolve, and butanol. The reaction temperature is not critical and can range between 65°–150° C. The duration of the reaction is not critical. Some guanazole is obtained within a few minutes, particularly at temperatures as high as 100° C., but it is preferred to continue the reactions for 1–2 hours to complete same. Heating beyond 2–3 hours is generally purposeless.

The following examples illustrate without limiting the invention.

EXAMPLE 1

In its simplest form the invention involves the reaction of a metal salt of dicyanamide with a hydrazine to produce the corresponding metal salt of the guanazole, which can then be neutralized with acid to produce the free guanazole. If desired, the reaction can be carried out in two steps:

(a) Guanazole salt

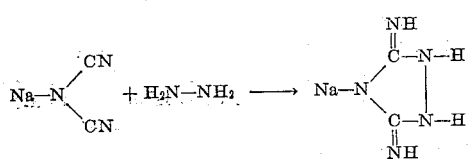

Sodium dicyanamide_____ 17.8 grams, 0.2 mole.
Hydrazine hydrate (85%) _____ 11.8 grams, 0.2 mole.
Water _____ 100 cc.

The above reagents were placed in a 500-cc. flask equipped with a stirrer, thermometer and reflux condenser. The reaction solution was heated on a steam bath for 1 hour during which time some ammonia was evolved. The solution was then evaporated to dryness under reduced pressure to remove any unreacted hydrazine, leaving crude sodium guanazole.

(b) Free guanazole

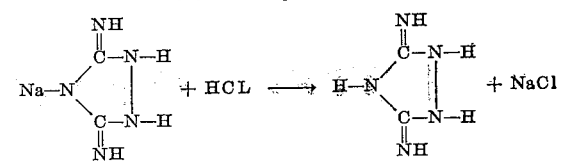

The sodium guanazole residue was dissolved in water and upon neutralizing with concentrated HCl, a gelatinous precipitate formed, which was removed. The solution was then adjusted to a pH of 8 and again evaporated to dryness under reduced pressure. The residue was extracted with methanol giving 13.5 grams (68% yield) of guanazole.

As the free guanazole is generally the preferred material it is generally preferred not to isolate the metal guanazole, but to neutralize it as it is formed, as shown in the following examples.

EXAMPLE 2

Sodium dicyanamide_____ 17.8 grams, 0.2 mole.
Hydrazine dihydrochloride _____ 21 grams, 0.2 mole.
Sodium hydroxide_____ 8 grams, 0.2 mole.
Water _____ 100 cc.

The sodium dicyanamide was suspended in 50 cc. of water which had been placed in a 500-cc. flask equipped with a stirrer and reflux condenser. The sodium hydroxide was dissolved in 20 cc. of water and this solution was added to the hydrazine dihydrochloride which had been dissolved in 30 cc. of water. This solution (practically neutral to pH paper) was then added to the sodium dicyanamide suspension at 20–25° C. Since no vigorous reaction occurred the reaction mixture was heated on a steam bath (100°–97° C.) for 2 hours. The clear solution was then evaporated to dryness under reduced pressure and the residue extracted with 100 cc. of boiling 2B-alcohol (ethanol denatured with benzene). On filtering and cooling 4 grams (20% yield) of guanazole M. P. 195°–200° C. was obtained. Considerably more product was obtained by extraction, concentration and recrystallization.

EXAMPLE 3

Sodium dicyanamide_____ 17.8 grams, 0.2 mole.
Hydrazine sulfate_____ 26 grams, 0.2 mole.
Sodium hydroxide_____ 8 grams, 0.2 mole.
Water _____ 100 cc.

The sodium dicyanamide and 50 cc. of water were placed in a 500-cc. flask equipped with a stirrer, thermometer and reflux condenser. The sodium hydroxide, dissolved in 20 cc. of water, was added to the hydrazine sulfate dissolved in 30 cc. of water giving a neutral solution which was then added to the flask. The reaction solution was heated on a steam bath for 1 hour during which time the temperature dropped from a maximum of 100° C. to 97° C. The slightly alkaline solution was then evaporated to dryness under reduced pressure. The dry residue was extracted with methanol. Upon cooling and filtering the methanol solution, followed by further concentration and cooling 14.3 grams (72.3% of the theoretical) of guanazole was isolated.

EXAMPLE 4

Sodium dicyanamide_____ 17.8 grams, 0.2 mole.
Hydrazine dihydrochloride _____ 21 grams, 0.2 mole.
Sodium _____ 4.6 grams, 0.2 mole.
2B-alcohol _____ 100 cc.

The sodium was dissolved in the alcohol which had been placed in a 500-cc. flask equipped with a stirrer and reflux condenser. The hydrazine dihydrochloride was then added and the mixture refluxed until the reaction mixture became neutral to pH paper, indicating the conversion of the hydrazine salt to the monohydrochloride. Upon cooling to room temperature the sodium dicyanamide was added. The mixture was then refluxed for 2 hours and filtered hot.

From this filtrate there separated 4 grams of white guanazole crystals of M. P. 195–200° C. The 4 grams represents a yield of 20%; however, considerably more was obtained by further alcohol extraction, concentration and recrystallization.

EXAMPLE 5

*Phenylguanazole*

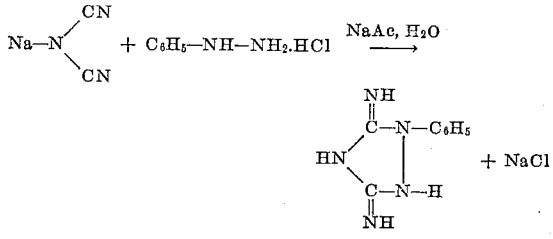

Sodium dicyanamide_____ 17.8 grams, 0.2 mole.
Phenylhydrazine .HCl____ 29 grams, 0.2 mole.
Water _____ 100 cc.
Sodium acetate_____ 10 grams.

The phenylhydrazine .HCl was placed in a 500-cc. flask equipped with a stirrer, thermometer and reflux condenser. The water was added giving an acid solution which became neutral on adding the sodium acetate. The sodium dicyanamide was then added and the reaction solution was heated on a steam bath for 1 hour during which time the temperature dropped from a maximum of 105° C. to 97° C. The light orange neutral solution was evaporated to dryness under reduced pressure. The dry solid was first extracted with 500 cc. of chloroform in a Soxhlet extractor. On concentration and cooling of this chloroform solution, eight grams of phenylguanazole was obtained. The residue was then extracted with methanol and this methanol extract was recrystallized from water giving an additional 15 grams of phenylguanazole. The phenylguanazole [23 grams (66% of the theoretical)] had a melting range of 168–175° C. In the above procedure, when the sodium acetate buffer is omitted, phenylguanazole is obtained, but in reduced yield.

While the invention has been described with particular reference to specific embodiments, it is to be understood that it is not to be limited thereto but is to be construed broadly and restricted solely by the scope of the appended claims.

We claim:

1. The method of preparing a guanazole that comprises heating at 65°–150° C. a member of the group consisting of dicyanamide and its metal salts with a member of the group consisting of a hydrazine of the formula

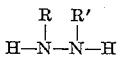

and salts thereof, in which R and R' are members of the group consisting of hydrogen and alkyl-hydrocarbon and aromatic-hydrocarbon radicals, in an inert solvent, under substantially non-acidic conditions.

2. The method according to claim 1 in which the dicyanamide is formed in situ in the inert solvent by action of an acid on a metal dicyanamide salt.

3. The method according to claim 2 in which the acid is an acidic hydrazine salt.

4. The method according to claim 3 that comprises reacting in water substantially equimolar amounts of an alkali metal dicyanamide, hydrazine dihydrochloride, and an alkali metal hydroxide.

5. The method according to claim 3 that comprises reacting in water substantially equimolar amounts of an alkali metal dicyanamide, hydrazine sulfate, and an alkali metal hydroxide.

6. The method of preparing phenylguanazole that comprises reacting substantially equimolar amounts of an alkali metal dicyanamide with phenylhydrazine hydrochloride in water.

7. The method according to claim 6 in which the reaction is conducted in the presence of a buffer.

8. The method according to claim 1 in which water, at about 100° C. is the solvent and the pH of the reaction is maintained at at least 4.

DONALD W. KAISER.
JOHN J. ROEMER.

No references cited.